UNITED STATES PATENT OFFICE.

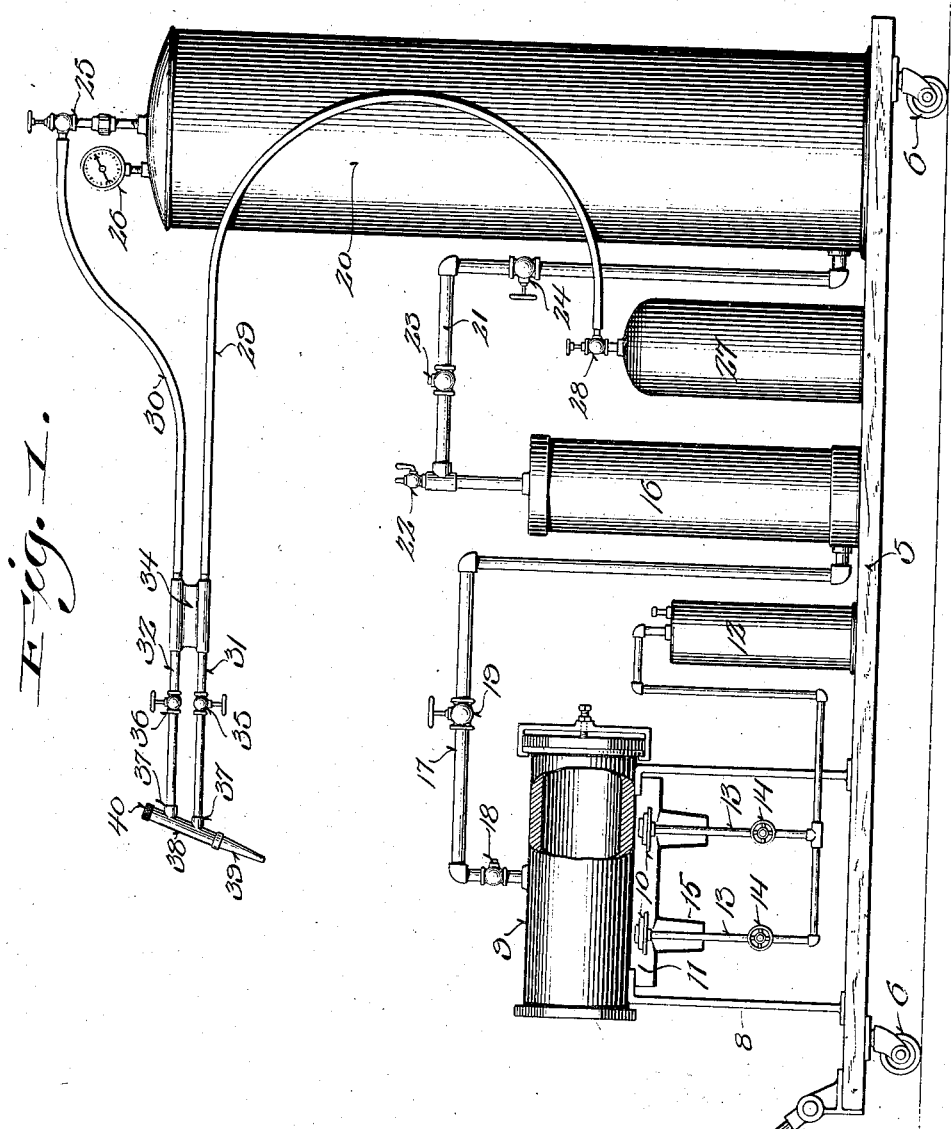

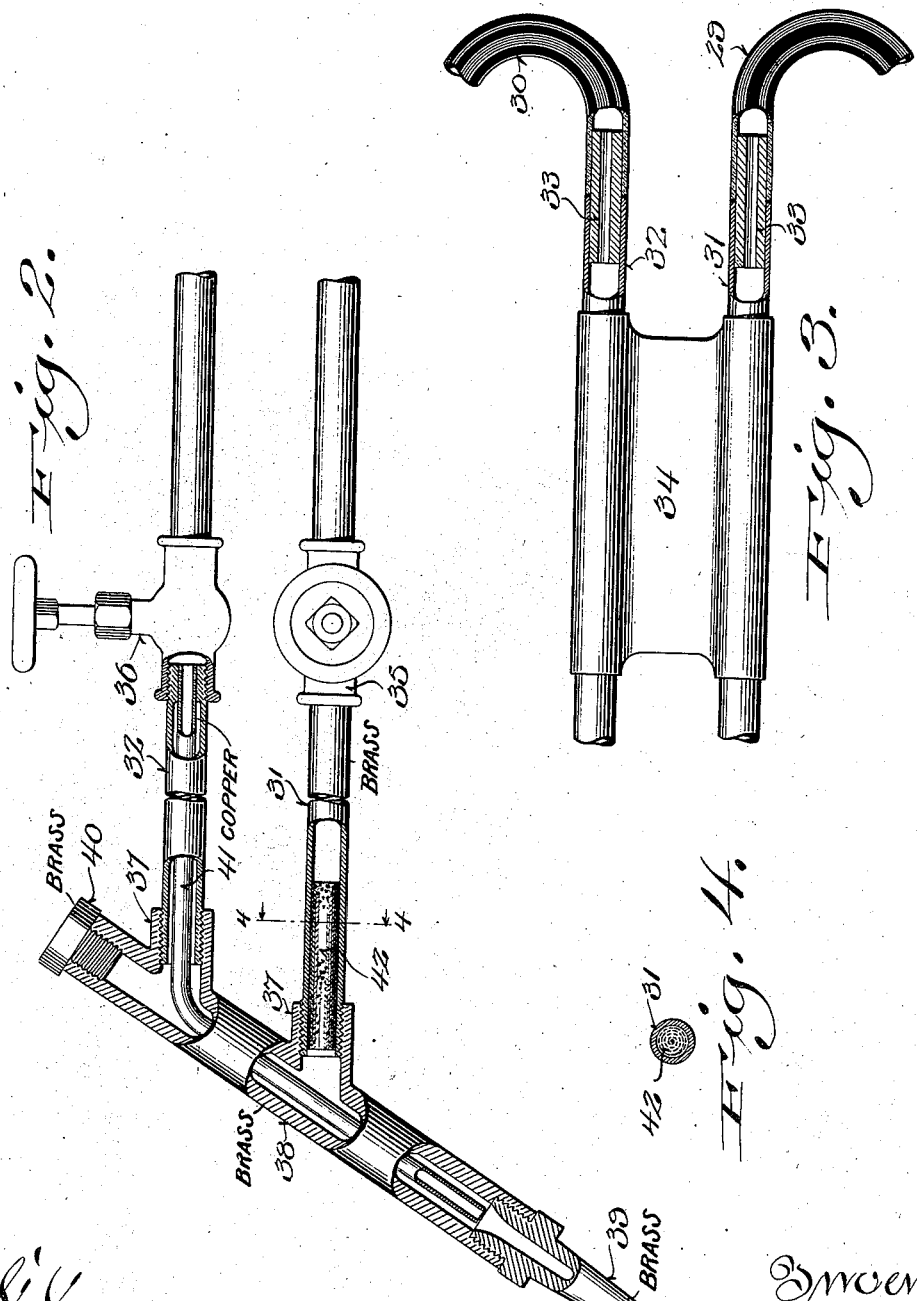

MICHAEL L. POPP, OF MILWAUKEE, WISCONSIN.

OXYACETYLENE APPARATUS.

1,136,437.  Specification of Letters Patent.  Patented Apr. 20, 1915.

Application filed January 22, 1914. Serial No. 813,765.

*To all whom it may concern:*

Be it known that I, MICHAEL L. POPP, a citizen of the United States, and resident of Milwaukee, in the county of Milwaukee and State of Wisconsin, have invented certain new and useful Improvements in Oxyacetylene Apparatus; and I do hereby declare that the following is a full, clear, and exact description thereof.

My invention consists in what is herein particularly set forth with reference to the accompanying drawings and pointed out in the claims of this specification, its object being to provide oxyacetylene apparatus for welding and other purposes with simple, economical and efficient durable gas-mixing burners designed to insure such thorough mixing of the gases therein as to provide against crystallization of cooling metal attacked by the ignited mixture.

Figure 1 of the drawings represents a side elevation of a portable apparatus embodying my invention and partly broken away; Fig. 2, a similar view of the forward portion of the burner element of the apparatus; Fig. 3, a like view of the rear portion of the burner illustrating the connection of pipes thereof with hose through which oxygen gas and acetylene gas are fed from valve-fittings of storage-tanks, and Fig. 4, a sectional view indicated by line 4—4 in Fig. 2.

Referring by numerals to the drawings, 5 indicates the platform, 6 caster-wheels and 7 the handle of a truck. Mounted on the truck are standards 8 supporting a cylindrical retort 9 in which to generate oxygen gas, heat being supplied from burners 10 arranged under the retort within a suitably disposed housing 11 and in pipe-connection with a tank 12 upon the truck, this tank being for gasolene or other hydrocarbon liquid under pressure. The burner-pipes 13 are controlled by cocks 14, and said housing is provided with depending air-flues 15.

The retort 9 is in pipe-connection with a filter-tank 16 on the truck, the pipe 17 being provided with a check-valve fitting 18 and a cut-off valve fitting 19. The filter-tank is in pipe-connection with a storage-tank 20 also on said truck, and the pipe 21 is provided with a pet-cock-fitting 22, a check-valve-fitting 23 and a cut-off valve-fitting 24. The outlet of the storage-tank is a gas-control valve-fitting 25, and a pressure-gage 26 is also employed in connection with said storage-tank. Another storage-tank 27, containing acetylene gas under pressure, is supported on the truck and provided with a gas-control valve-fitting 28, this fitting and the one 25 in connection with the oxygen-gas storage-tank being connected by flexible pipes in the form of suitable hose 29 and 30 to pipes 31, 32, of a burner. As a matter of detail, each hose is slipped on a tube 33 projecting from the relative burner pipe at the rear of the same as shown in Fig. 3.

The burner-pipes 31 and 32 are connected by a handle-fitting 34, and said pipes are provided with cut-off valve-fittings 35, 36, respectively. The forward ends of the burner pipes are screw-threaded in nipples 37 of a preferably inclined hollow head 38 providing at one end with a taper-bore preferably conical flame-tip 39 screw-threaded in place, and at its other end said head is provided with a screw-plug fitting 40, the plug being removable to provide for cleaning of said head and tip. The burner-pipes, head, tip and plug are of brass or other suitable non-corrosive material, and extending from the valve-fitting 36 through the forward portion of the pipe 32 to discharge within said head at a predetermined point beyond the inlet of the pipe 31 thereto, say at about the inner end of the flame-tip 39, is a non-corrosive, preferably copper, tube 41 through which the oxygen-gas has its outlet to mingle with acetylene gas, the mixture being ignited at the mouth of said tip. To prevent the flame from extending back in the burner-pipe 31, the forward end of this pipe is provided with a filling 42 of rolled brass-wire or other suitable non-corrosive metal-screening.

In practice the apparatus, as a whole, is moved from place to place for welding and other operations, and there is an economy of oxygen gas by production of the same at the place of use. With particular reference to the tube 41 discharging in close proximity to the inner end of the flame-tip 39, the construction of said burner is such as to provide for a thorough mixing of the oxygen and acetylene gases therein, and this being the case, the metal attacked by the ignited mixture will not crystallize on cooling. Because of the hose connecting the oxygen and acetylene storage tanks with the burner, the manipulation of said burner is facilitated, and the gas-control valve-fittings 35, 36, are forward of the handle 31. It is also to be noted that the organization of the burner is such that the flame-tip head 38 is devoid of packing-joints.

I claim:

1. In oxyacetylene apparatus having a gas-mixing burner element comprising a non-corrosive cock-controlled pipe for valve-controlled flexible pipe connection with an oxygen-gas storage-tank, another non-corrosive cock-controlled pipe for similar connection with an acetylene-gas storage-tank, a hollow head to which the cock-controlled pipes are coupled, a non-corrosive oxygen-gas conveyer-tube leading from the cock of one pipe and through said pipe to discharge within the head at a predetermined point beyond the inlet thereto of the other pipe, and a flame-tip extending from said head.

2. An oxyacetylene apparatus having a gas-mixing burner element comprising a non-corrosive cock-controlled pipe for valve-controlled flexible pipe connection with an oxygen-gas storage-tank, another non-corrosive cock-controlled pipe for similar connection with an acetylene-gas storage-tank, a conveniently arranged handle connecting the cock-controlled pipes, a hollow head to which said pipes are coupled, a non-corrosive oxygen-gas conveyer-tube leading from the cock of one pipe and through said pipe to discharge within the head at a predetermined point beyond the inlet thereto of the other pipe, and a flame-tip extending from said head.

3. An oxyacetylene apparatus having a gas-mixing burner element comprising a non-corrosive cock-controlled pipe for valve-controlled flexible pipe connection with an oxygen-gas storage-tank, another non-corrosive cock-controlled pipe for similar connection with an acetylene-gas storage-tank, a hollow head to which the cock-controlled pipes are coupled, a non-corrosive oxygen-gas conveyer-tube leading from the cock of one pipe and through said pipe to discharge within the head at a predetermined point beyond the inlet thereto of the other pipe, a flame-check in the forward end of the acetylene-gas conveyer-pipe, and a flame-tip extending from said head.

In testimony that I claim the foregoing I have hereunto set my hand at Milwaukee in the county of Milwaukee and State of Wisconsin in the presence of two witnesses.

MICHAEL L. POPP.

Witnesses:
SIMON KANDER,
LOUISE KUEHN.